(12) United States Patent  (10) Patent No.: US 8,215,120 B2
Kundig  (45) Date of Patent: Jul. 10, 2012

(54) PROCESS FOR COOLING A STORAGE CONTAINER

(75) Inventor: Andres Kundig, Meilen (CH)

(73) Assignee: Linde Aktiengesellschaft, Munich (DE)

( * ) Notice: Subject to any disclaimer, the term of this patent is extended or adjusted under 35 U.S.C. 154(b) by 822 days.

(21) Appl. No.: 12/367,162

(22) Filed: Feb. 6, 2009

(65) Prior Publication Data

US 2009/0199579 A1    Aug. 13, 2009

(30) Foreign Application Priority Data

Feb. 7, 2008  (DE) .......................... 10 2008 007 923

(51) Int. Cl.
*F25B 1/00*      (2006.01)
(52) U.S. Cl. ........................................................ 62/115
(58) Field of Classification Search .................... 62/50.2, 62/115, 607
See application file for complete search history.

(56) References Cited

U.S. PATENT DOCUMENTS 3,109,725 A * 11/1963 Flynn .............................. 62/616
3,142,159 A *  7/1964 Berlad ........................... 62/46.3

* cited by examiner

*Primary Examiner* — Melvin Jones
(74) *Attorney, Agent, or Firm* — Millen, White, Zelano & Branigan, P.C.

(57) ABSTRACT

A process for cooling a storage container, in particular a mobile storage container for a cryogenic medium, is described.
According to the invention, the following process steps and features are provided:
 a) Direct or indirect connection of the storage container (S) that is to be cooled to a refrigeration circuit (2-8, V, T, a, a'),
 b) Whereby a cold medium, which is identical to or different from the medium that is to be stored in the storage container that is to be cooled, circulates in the refrigeration circuit,
 c) Whereby the cold medium is compressed (V), cooled (E), and expanded (T) to produce cold, and
 d) At least a partial stream of the cold medium (5, 7) is used for the cooling of the storage container (S) that is to be cooled.

16 Claims, 1 Drawing Sheet

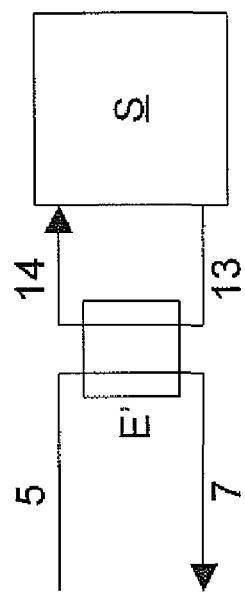
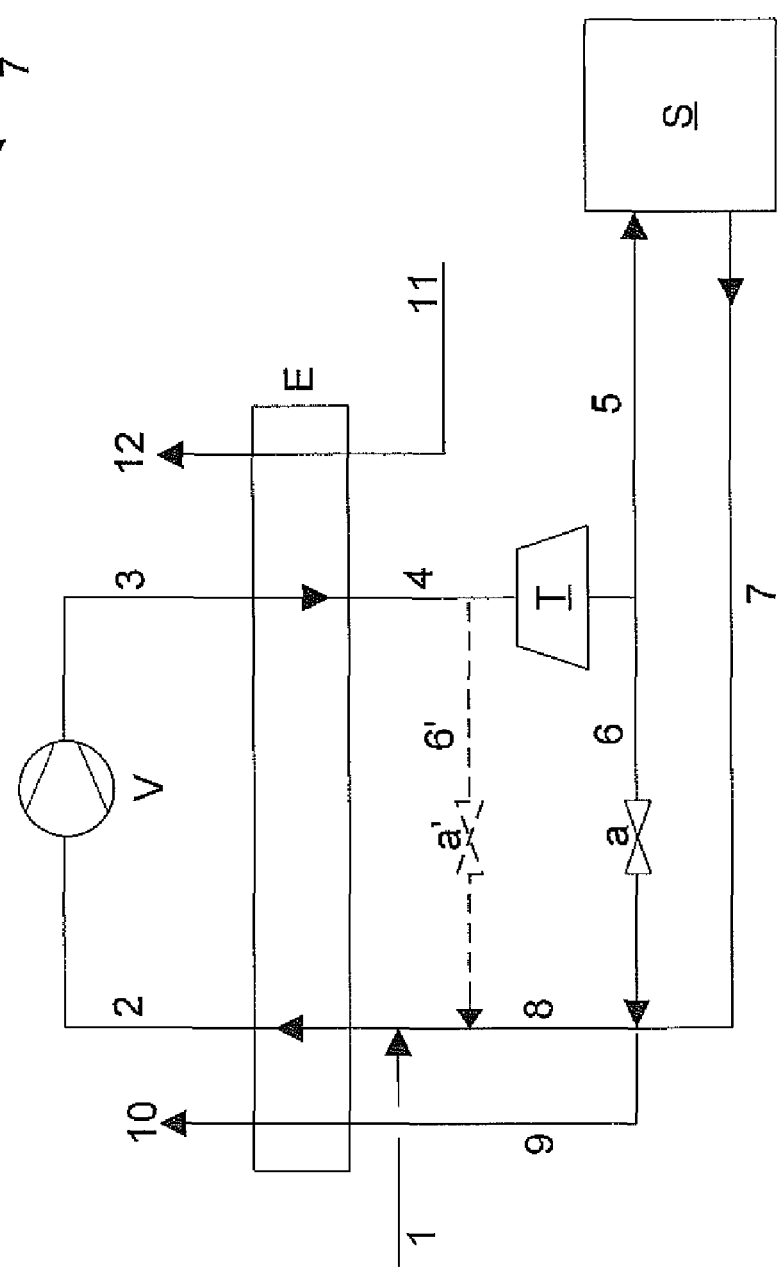

PROCESS FOR COOLING A STORAGE CONTAINER

The invention relates to a process for cooling a storage container, in particular a mobile storage container for a cryogenic medium.

Generic processes for (re)cooling storage containers are used, for example, in helium and hydrogen distribution. Thus, the noble gas helium is usually obtained from natural gas. Consequently, the production of helium is limited to a few countries, such as the U.S.A., Russia, Algeria, or Qatar. The worldwide distribution of helium takes place in which helium is cooled to below 4.5 K and in this case is liquefied and then is transported and distributed in insulated storage containers.

These helium storage containers should actually always be kept at a temperature of at least 50 to 60 K. For this reason, helium storage containers should not be completely emptied. Also, the radiation shield of such storage containers that is usually to be provided should always be cooled by means of liquid nitrogen. Only thus can it be ensured that helium storage containers heat only slightly to 50 to 60 K.

Before a renewed filling of a helium storage container with helium, the storage container must be cooled again to 4.5 K, since otherwise the in-flowing, liquid helium would evaporate. In practice, however, the helium storage containers are often delivered to the filling station at temperatures of 150 K and more. Before the filling with liquid helium, they must therefore first be cooled to the temperature of liquid helium. This cooling or recooling of the storage containers is usually carried out in the (helium) filling stations, whereby liquid helium is sent from the storage tank of the filling station by the storage containers that are to be cooled, and the latter is thus cooled. The helium that is used in this connection is in this case completely evaporated, optionally has to be purified, and—if it is not to be discarded—liquefied again.

The previously described cooling process has a comparatively high energy requirement, however, since it is extremely inefficient exergetically to use refrigerating capacity, which is produced at the temperature of 4.5 K, at temperatures of 150 K and more. Also, the previously described cooling process has the drawback that with the gaseous helium that accumulates in addition during the cooling, the capacity of the helium liquefier that is usually provided in the filling station is often exceeded. As a consequence, expensive helium gas has to be released into the ambient air.

The object of this invention is to indicate a generic process for cooling a storage container, in particular a mobile storage container for a cryogenic medium, which avoids the above-mentioned drawbacks.

To achieve this object, a generic process for cooling a storage container, in particular a mobile storage container for a cryogenic medium, is proposed, and said process has the following process steps and features:

a) Direct or indirect connection of the storage container that is to be cooled to a refrigeration circuit,
b) Whereby a cold medium, which is identical to or different from the medium that is to be stored in the storage container that is to be cooled, circulates in the refrigeration circuit,
c) Whereby the cold medium is compressed, cooled and expanded to produce cold, and
d) At least a partial stream of the cold medium is used for the cooling of the storage container that is to be cooled.

Other advantageous configurations of the process according to the invention for cooling a storage container, in particular a mobile storage container for a cryogenic medium, are characterized in that A direct connection of the storage container that is to be cooled to the refrigeration circuit is carried out by the cold medium that circulates in the refrigeration circuit being sent through the storage container that is to be cooled, An indirect connection of the storage container that is to be cooled to the refrigeration circuit is carried out by the cold medium that circulates in the refrigeration circuit releasing its coldness to an auxiliary refrigeration circuit, whose cold medium is sent through the storage container that is to be cooled, Helium or hydrogen is used as a cold medium, Contaminated cold medium is drawn off from the refrigeration circuit and is replaced by new and/or prepared cold medium, The compression of the cold medium that circulates in the refrigeration circuit is carried out in one or multiple stages, and The expansion of the cold medium circulating in the refrigeration circuit is carried out in one or multiple stages.

BRIEF DESCRIPTION OF THE DRAWINGS

The process according to the invention for cooling a storage container, in particular a mobile storage container for a cryogenic medium, as well as other configurations thereof are explained in more detail below based on the embodiments depicted in FIGS. 1 and 2.

The storage container that is to be cooled is depicted in FIGS. 1 and 2 in the form of a so-called blackbox S. The latter stands for one or more storage containers that are to be cooled, for example for storage containers that are used in the transport of liquid helium and that are normally arranged on truck trailers.

FIG. 1 depicts a refrigeration circuit that has the line sections 2 to 8, in which the cold medium of the refrigeration circuit circulates. If the refrigeration circuit that is depicted uses the direct cooling of the storage container that is to be cooled, the line sections 5 and 7 are directly connected to the storage container S. If the storage container S that is to be cooled is a helium storage container, helium is preferably used as the cold medium of the refrigeration circuit. Analogously to this, in the case of a hydrogen storage container S that is to be cooled, preferably hydrogen is used as the cold medium within the refrigeration circuit.

In the case of recooling a hydrogen storage container, however, a procedure as depicted in FIG. 2 can also be carried out. The latter shows an "indirect connection" of the storage container S that is to be cooled to a refrigeration circuit, as it is depicted in FIG. 1. This indirect connection of the storage container S that is to be cooled to a refrigeration circuit is carried out by a heat exchanger E' being provided, in which the cold medium of the refrigeration circuit—the latter is fed via the line sections 5 and 7 to the heat exchanger E' or drawn off from the latter—releases its coldness to an auxiliary refrigeration circuit. The latter is depicted by the line sections 13 and 14. Cold medium that circulates in this auxiliary refrigeration circuit is sent through the storage container S that is to be cooled and cools the latter.

In the approach depicted in FIG. 2, helium circulates as the cold medium in the refrigeration circuit 2 to 8, while hydrogen is logically selected as the cold medium of the auxiliary refrigeration circuit 13, 14. By means of this procedure, it is ensured that a contamination of the hydrogen storage container S that is to be recooled can be avoided.

The cold medium that circulates in the line sections 2 to 8 of the refrigeration circuit is compressed by about 1 bar absolute to about 10 bar absolute in the case that helium is used as cold medium in the compressor unit V that is designed in one or multiple stages. Via line 3, the compressed helium stream is fed to the heat exchanger E and is cooled to a temperature of about 80 K in this heat exchanger against a nitrogen stream that is to be heated and that is sent via the line sections 11 and 12 through the heat exchanger E. Via line 4, the helium stream is then fed to a turbine T that is designed in one or multiple stages and is expanded in the latter to a final pressure of about 2 bar absolute. At the outlet of turbine T, the helium stream is present below a temperature of about 53 K.

A separation of the helium stream into two partial streams is now carried out. While the first partial stream is fed via line 5 to the storage container S that is to be recooled and the cooling of the storage container S is used, the second partial stream is sent via the line 6 as well as an adjustable bypass valve a. After passage through the storage container S that is to be recooled, the first partial stream is mixed in line 7 with the second partial stream in line 6. Via line 8, the helium stream is fed to the heat exchanger E, heated in the latter, and fed via line 2 to the input of the compressor unit V.

The process according to the invention makes it possible to cool storage container S that is to be recooled by means of a closed refrigeration circuit to about 60 K. At 60 K, the enthalpy of the normally used materials or metals of the storage container that is to be recooled is now about $\frac{1}{10}$ of the enthalpy at a temperature of 150 K.

The temperature that is reached during mixing of the two cold medium partial streams from the lines 6 and 7 should not exceed 120 K, so that it can be ensured that the thermal tension in the heat exchanger E can be kept low enough. The limitation to a mixing temperature of 120 K has the consequence that the amount of the helium partial stream that is sent through the storage container S that is to be recooled increases with decreasing temperature within the storage container S. As soon as the inside temperature of the storage container S has dropped below 120 K, the bypass valve a is closed.

As an alternative to the previously described procedure, in which a division of the helium stream is carried out only after the expansion T, a helium partial stream can also be drawn off as early as before the expansion stage and fed to the input of the heat exchanger E, which FIG. 1 depicts by the line 6' that is indicated by dotted lines as well as the bypass valve a' that is shown in dotted lines.

To maintain the pressures within the refrigeration circuit, cold medium has to be supplemented optionally during the cooling process. In the case of a helium refrigeration circuit, for this purpose helium gas can be supplemented by feeding via the line 1 from a helium-liquefaction process that is not shown in the figure.

If a storage container S that is to be recooled is contaminated, a partial stream of the cold medium can be drawn off from the refrigeration circuit via the line sections 9 and 10 and subjected to a secondary cleaning corresponding to an advantageous configuration of the process according to the invention during the cooling process.

The process for cooling a storage container according to the invention makes it possible to make available the coldness, required for the recooling of the storage container, to an exergetically useful temperature level. This has the consequence that the degree of efficiency of the recooling process is significantly improved.

The normally provided helium liquefaction unit is not disrupted in its operation by the recooling process according to the invention and can thus generate its maximum possible output continuously. Moreover, the cooling times of the storage container that is to be recooled are shortened by several days.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding DE application No. 10 2008 007 923.5, filed Feb. 7, 2008 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for cooling a storage container for storing a medium, said process comprising:
   a) directly or indirectly connecting the storage container (S) that is to be cooled to a refrigeration circuit (2-8, V, T, a, a'),
   circulating in said refrigeration circuit a cold medium, which is identical to or different from the medium that is to be stored in the storage container that is to be cooled,
   c) compressing (V), cooling (E), and expanding (T) said cold medium to produce cold, and
   d) using at least a partial stream of said cold medium (5, 7) for cooling the storage container (S) that is to be cooled,
   wherein
   (i) said storage container (S) is directly connected to said refrigeration circuit, and the direct connection of the storage container (S) to the refrigeration circuit (2-8, V, T, a, a') is carried out by sending the cold medium that circulates in the refrigeration circuit through the storage container (S) that is to be cooled, or
   (ii) said storage container (S) is indirectly connecting to said refrigeration circuit, and the indirect connection of the storage container (S) to the refrigeration circuit (2-8, V, T, a, a') is carried out by the cold medium circulating in the refrigeration circuit releasing (E') its coldness to an auxiliary refrigeration circuit (13, 14) having a further cold medium, and said further cold medium is sent through the storage container (S) that is to be cooled.

2. The process according to claim 1, wherein said storage container (S) is directly connecting to said refrigeration circuit, and the direct connection of the storage container (S) to the refrigeration circuit (2-8, V, T, a, a') is carried out by sending the cold medium that circulates in the refrigeration circuit through the storage container (S) that is to be cooled.

3. The process according to claim 1, wherein said storage container (S) is indirectly connecting to said refrigeration circuit, and the indirect connection of the storage container (S) to the refrigeration circuit (2-8, V, T, a, a') is carried out by the cold medium circulating in the refrigeration circuit releasing (E') its coldness to an auxiliary refrigeration circuit (13, 14) having a further cold medium, and said further cold medium is sent through the storage container (S) that is to be cooled.

4. The process according to claim 1, wherein helium or hydrogen is used as said cold medium.

5. The process according to claim 1, wherein contaminated cold medium is drawn off from the refrigeration circuit (2-8, V, t, a, a') and is replaced by new and/or prepared cold medium.

6. The process according to claim 1, wherein the compression (V) of the cold medium that circulates in the refrigeration circuit (2-8, V, T, a, a') is carried out in one stage.

7. The process according to claim 1, wherein the expansion (T) of the cold medium that circulates in the refrigeration circuit (2-8, V, T, a, a') is carried out in one stage.

8. The process according to claim 1, wherein said medium stored in said storage container (S) is a cryogenic medium.

9. The process according to claim 1, wherein the compression (V) of the cold medium that circulates in the refrigeration circuit (2-8, V, T, a, a') is carried out in multiple stages.

10. The process according to claim 1, wherein the expansion (T) of the cold medium that circulates in the refrigeration circuit (2-8, V, T, a, a') is carried out in multiple stages.

11. The process according to claim 2, wherein helium or hydrogen is used as said cold medium.

12. The process according to claim 3, wherein hydrogen or hydrogen is used as said cold medium.

13. The process according to claim 11, wherein said medium stored in said storage container (S) is the same as said cold medium.

14. The process according to claim 12, wherein said medium stored in said storage container (S) is different than said cold medium.

15. The process according to claim 1, wherein, after said cold medium is expanded, said cold medium is divided into two partial streams (5, 6), the first partial stream (5) being used to cool the storage container, and the second partial stream (6) is combined with the first partial stream (5), after the latter has cooled the storage container, and returned (8) back to the compressing (V).

16. The process according to claim 1, wherein, before said cold medium is expanded, said cold medium is divided into two partial streams (5, 6'), the first partial stream (5) being used to cool the storage container, and the second partial stream (6') is combined with the first partial stream (5), after the latter has cooled the storage container, and returned (8) back to the compressing (V).

* * * * *

UNITED STATES PATENT AND TRADEMARK OFFICE
CERTIFICATE OF CORRECTION

| | |
|---|---|
| PATENT NO. | : 8,215,120 B2 |
| APPLICATION NO. | : 12/367162 |
| DATED | : July 10, 2012 |
| INVENTOR(S) | : Kundig |

It is certified that error appears in the above-identified patent and that said Letters Patent is hereby corrected as shown below:

Column 6, line 1 reads "12. The process according to claim 3, wherein hydrogen or"
should read -- 12. The process according to claim 3, wherein helium or --

Signed and Sealed this
Sixth Day of November, 2012

David J. Kappos
*Director of the United States Patent and Trademark Office*